United States Patent [19]

Fleming et al.

[11] Patent Number: 5,664,210

[45] Date of Patent: Sep. 2, 1997

[54] METHOD AND SYSTEM OF PROVIDING MULTIPLE SELECTIONS IN TEXT ON A COMPUTER DISPLAY

[75] Inventors: Stephen S. Fleming, Dallas; Robert J. Torres, Colleyville, both of Tex.

[73] Assignee: International Business Machines Corporation, Armonk, N.Y.

[21] Appl. No.: 746,680

[22] Filed: Aug. 19, 1991

[51] Int. Cl.$^6$ ..................................................... G06F 17/24
[52] U.S. Cl. ............................................ 395/793; 395/803
[58] Field of Search .................................. 395/146, 145, 395/157, 148, 149, 155, 159; 345/127, 157, 159, 160

[56] References Cited

U.S. PATENT DOCUMENTS 4,806,916  2/1989  Raskin et al. ........................... 340/709
5,321,801  6/1994  Ando ....................................... 395/145

OTHER PUBLICATIONS

*Microsoft Excel User's Guide*, 1990, pp. 101–106.

*Microsoft Excel User's Guide*; 1990; pp. 34–35, 76–79, 167–169, 204–205.

*Microsoft Windows Write User's Guide*; 1987; pp. 14–30.

*Primary Examiner*—Joseph H. Field
*Attorney, Agent, or Firm*—Geoffrey A. Mantooth

[57] ABSTRACT

Multiple selections of text are provided while allowing swipe and type editing operations. A normal typing cursor is displayed to indicate where newly input text will be inserted. A portion of text may be selected to conduct editing operations thereon. When the text has been selected, it is so designated by selected emphasis. The cursor is changed from the normal cursor to a second cursor. The second cursor has a shape that is different than the normal curser and indicates that subsequent typing will activate the swipe and type operation on the selected text. When the second cursor is moved, it reverts back to the normal cursor. Other portions of text can be selected by the cursor, wherein the normal cursor becomes the second cursor again. Actions can be performed simultaneously on the multiple selections of text. Typing operations support both insert and replace typing modes.

13 Claims, 6 Drawing Sheets

METHOD AND SYSTEM OF PROVIDING MULTIPLE SELECTIONS IN TEXT ON A COMPUTER DISPLAY

SPECIFICATION

1. Field of the Invention

The present invention relates to methods and systems that select text on a computer display.

2. Background of the Invention

Computers can be used to manipulate both text and graphical data. A common applications program on a computer that manipulates text data is a word processing program. With a word processing program, text data is input into the computer, either from the keyboard or from a storage medium. Once the text data is input, an operator can edit the text. Editing includes such operations as inserting new text in a desired location, deleting text from the data, or both deleting and inserting text in the same operation. The latter operation, where text is deleted and inserted in the same operation, is desirable for its efficiency in editing.

One way to both delete text and insert new text in the same operation is referred to as overtype or replace. When an operator edits text using an overtype operation, the operator selects the overtype function. The operator then types in the new text, wherein the new text replaces the old text character for character. The disadvantage to the overtype operation is that it is easy to accidentally delete text that lies just after the deleted old text, whenever the new text is longer than the deleted old text.

Another way to delete and insert text in the same operation is referred to as swipe and type. An operator uses the swipe and type operation by selecting the text that is to be deleted. "Swipe" refers to the operation used to select text. The swipe and type function is automatically initiated when the operator types in the new text in the location of the selected text. The selected old text is deleted and the new text is inserted at the location of the old text. With the swipe and type operation, the new text is not limited to the length of the old text, as in the overtype operation.

The swipe and type operation utilizes an element that is fundamental to other types of operations. This is the selection of text, which directs the operation that is to be implemented by the computer to act on a specific portion of the text. For example, text is selected to underline the text, to change the font of the text, to move the text and so on. Selected text is visually indicated as such on the display by contrasting it with the surrounding, unselected text. Such contrasting emphasizes the selected portion of text to the operator and typically occurs by highlighting. When text is selected, the normal typing cursor disappears and is replaced by the highlighting.

In order to increase operator efficiency, it is desirable to provide for the selection of multiple portions of text at the same time. It would be particularly useful if the selected portions of text would not have to be adjacent to each other. This allows an operator to perform a single action on plural portions of selected text. For example, an action to make the selected portions of text bold could be utilized.

Unfortunately, in the prior art, the provision of multiple selection of text has proven to be incompatible with programs supporting the swipe and type operation. This is because after text is selected, typing a new character replaces the selected text with the typed character and subseqent typed new characters. If more than one selection is made, it is not clear what the result of typing new characters would be.

SUMMARY OF THE INVENTION

It is an object of the present invention to provide a method and system that provides for multiple selections of text while supporting swipe and type operations.

The present invention allows an operator to select multiple portions of text while supporting swipe and type operations. When a portion of text is selected, the normal cursor is changed to a second or swipe and type cursor that is located at the selected portion of text. The swipe and type cursor indicates that subsequent typing of text will achieve the swipe and type operation on the indicated selection. Other selections of text can be made by moving the cursor and selecting accordingly. When text is selected, the swipe and type cursor is displayed. The operator can perform a swipe and type operation on the single indicated selection. Alternatively, the operator can perform other actions, such as change font to bold, on the selected portions of text. The action will be performed on all of the selections.

In addition, the present invention allows the operator to deselect selected portions of text after inputting text or after moving the cursor. When moving the cursor, the operator has the option of either maintaining the selections already made, deselecting all selections, or deselecting all selections other than the selection just made. When inputting text, selections are always deselected.

The method of the present invention provides multiple selections in text in a data processing system while supporting swipe and type operations. The method displays text and a first cursor on an interface means for interfacing with an operator. The first cursor indicates where a text input into the data processing system will be inserted. An input from the operator is detected. The input selects a portion of the text on the interface means. The selected portion of text is displayed on the interface means with selected emphasis. The first cursor is changed to a second cursor and is displayed on the interface means at the selected portion of text. The second cursor indicates to the operator that the next text character input into the data processing system will complete a swipe and type operation on the selected portion of text.

In one aspect, the method further comprises the steps of detecting a text input after the second cursor is displayed. The selected portion of text is deleted at the second cursor and the detected text input is inserted at the deleted text location.

In still another aspect, the method includes the step of, after deleting the selected portion of text, changing the second cursor to the first cursor and displaying the first cursor at the deleted text location.

In still another aspect, the method displays text and a first cursor on an interface means for interfacing with an operator. The first cursor indicates where a text input into the data processing system will be inserted. A first input from the operator is detected. The first input selects a first portion of text on the interface means. The first portion of text is displayed on the interface means with selected emphasis. A second input from the operator is detected. The second input moves the first cursor to a new location in the text. The first cursor is displayed on the interface means in the new text location. A third input from the operator is detected. The third input selects a second portion of text on the interface means. The second portion of text is displayed with selected emphasis on the interface means. The first cursor is changed to a second cursor and displayed on the interface means at the respective selected portion of text whenever the respective selected portion of text is selected. While the second cursor is displayed, a fourth input is detected from the operator, with the fourth input including a text character. When the fourth input is detected, the respective selected portion of text is deleted and the text character is inserted.

The data processing system in the present invention includes interface means for displaying information from the system to an operator, means for displaying said information on said interface means, means for detecting an operator input for selecting a portion of text on the interface means and means for detecting a text character input when a second cursor is displayed. The means for displaying the information on the interface means is connected to the interface means. The information being displayed includes text and a first cursor for indicating where a next text character that is input into the data processing system will be inserted. The means for detecting an operator input for selecting a portion of text provides the selected portion of text with selected emphasis and changes the first cursor to a second cursor whenever the operator input is detected. The means for detecting an operator input is connected to the means for displaying the information. The means for detecting a text character input when the second cursor is displayed deletes the selected portion of text and inserts the detected next text character at the location of the deleted text. The means for detecting a text character input is connected to the means for displaying the information.

In the preferred embodiment, the interface means includes a display and the means for displaying information on the interface means, the means for detecting an operator input and the means for detecting a text character input are included in a processor unit.

A computer program product having a computer readable medium with computer program logic recorded thereon for providing multiple selections in text in a data processing system is also provided. The computer program product includes means for displaying the information on the interface means, means for detecting an operator input for selecting a portion of text on the interface means and means for detecting a text character input when a second cursor is displayed. The information being displayed includes text in a first cursor for indicating where a next text character that is input in the data processing system will be inserted. The means for detecting an operator input provides the selected portion of text with selected emphasis and changes the first cursor to a second cursor when the operator input is detected. The means for detecting a text character input when the second cursor is displayed deletes the selected portion of text and inserts the detected text character at the location of the deleted text.

BRIEF DESCRIPTION OF THE DRAWINGS

FIG. 6 is a flow chart that describes how an operator input is received and processed for routing to the various subroutines. FIG. 7 is a flow chart that describes the subroutine for letter input processing. FIG. 8 is a flow chart that describes the subroutine for cursor move processing. FIG. 9 is a flow chart that describes the subroutine for user action processing.

DESCRIPTION OF THE PREFERRED EMBODIMENT

Figure 1:
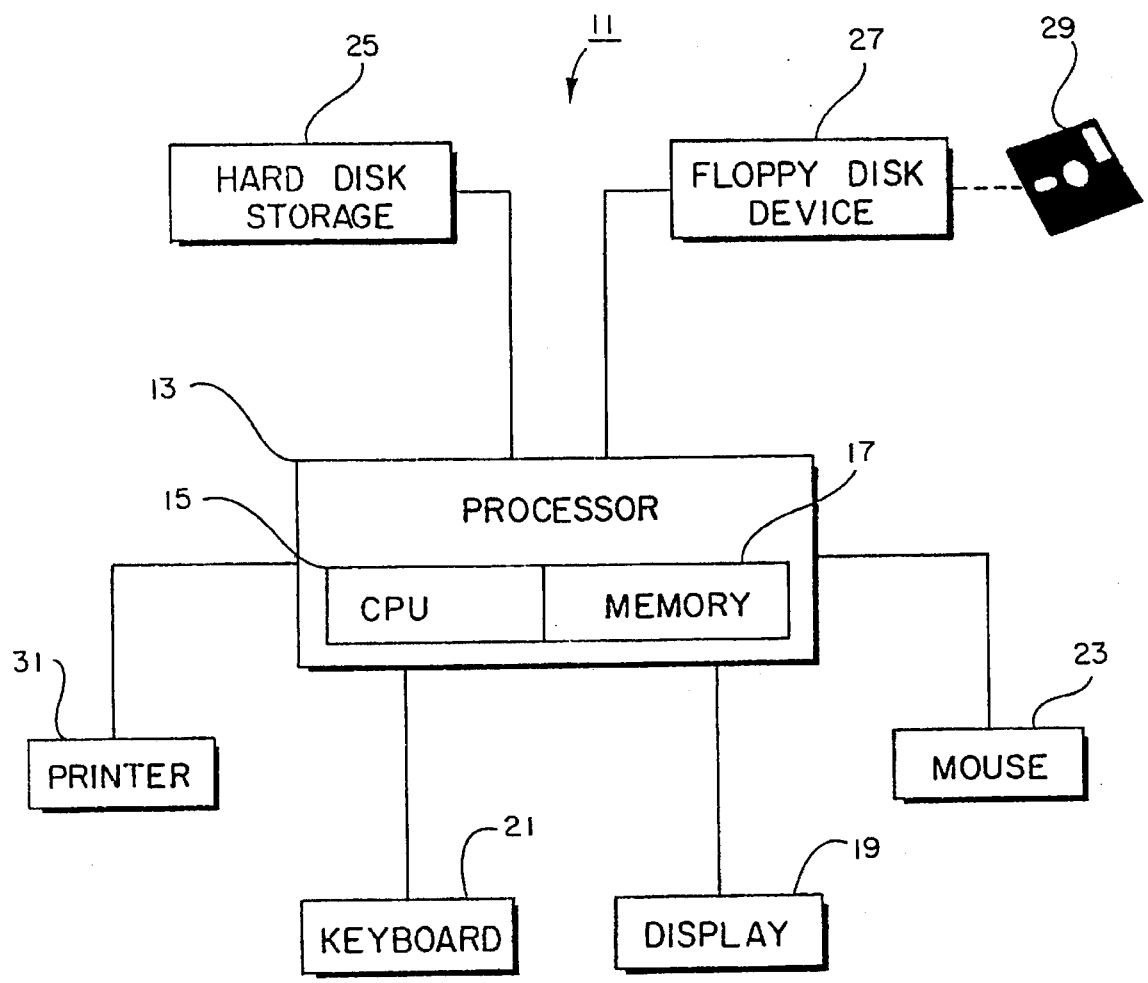
FIG. 1 is a block diagram showing a data processing system in accordance with the present invention.

In FIG. 1, there is shown a data processing system 11 or computer. The system has a processor 13, which itself has a central processor unit 15 and a memory 17, such as RAM and/or ROM, located therein. Peripheral devices are connected to the processor. A display unit 19, is connected to the processor 13. Input devices, in the form of a keyboard 21 and mouse 23, are also connected to the processor 13. Memory devices, in the 15 form of a hard disk storage 25 and a floppy disk device 27, are connected to the processor. The floppy disk device receives a floppy disk 29, which is a computer readable medium. The floppy disk 29 has computer program logic recorded thereon, which logic provides for the editing of text with, among other operations, insert operations, "swipe and type" operations and selections of multiple non-adjacent portions of text. There is also provided a printer 31 connected with the processor 13.

Figure 2:
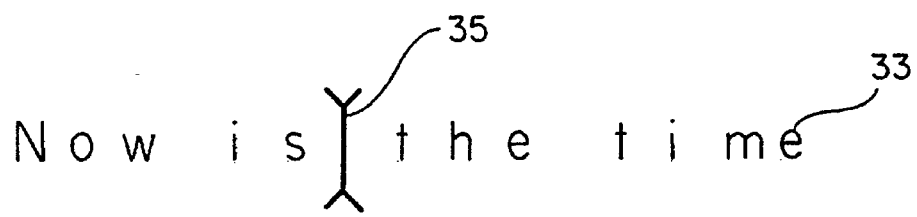
FIG. 2 is a schematic view of text, as shown on a display, showing the normal typing cursor.

The display 19 includes a display screen for presenting images to a computer operator or user. The images includes text images 33, as shown in FIG. 2. The text characters are typically input into the computer from the keyboard 21.

The method and system of the present invention allow editing of the display text through, among other types of operations, insert operations, replace operations, swipe and type operations, and selections of multiple non-adjacent portions of text.

To edit text using the insert operation, the normal typing cursor 35 is displayed. In the preferred embodiment, the normal cursor 35 is shown primarily as a vertical bar. As shown in FIG. 2, as text is put into the computer, the typing cursor 35 indicates where the next character will appear when input. Thus, in FIG. 2, the position of the cursor 35 indicates that text characters will be input after "is" and before "the". If the cursor were to be positioned at the end of the text, that is after "time", then subsequently input characters would be input after "time".

Figure 3:
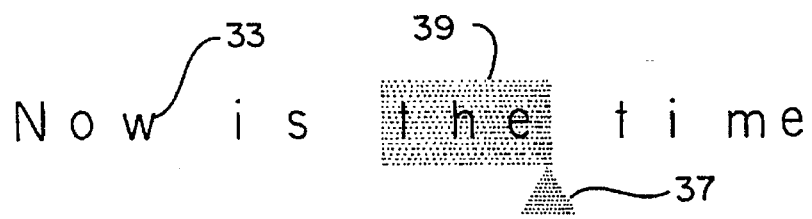
FIG. 3 is a schematic view of the text of FIG. 2, after a portion of text has been selected with the method of the present invention, in accordance with a preferred embodiment.

To edit using the "swipe and type" operation, the text that is to be deleted is selected and a second cursor 37 is displayed. The second cursor 37 has a different shape than the first or normal typing cursor. The operator first selects the portion of text which is to be deleted. In FIG. 3 for example, the word "the" has been selected. The computer indicates this by presenting "the" with a selected emphasis 39 or highlighting. The cursor is changed to the second or swipe and type cursor 37 to indicate to the operator that the swipe and type operation has been commenced. Subsequent typing will complete the swipe and type operation. In the preferred embodiment, the second cursor 37 is shown as a triangle that intersects the selected emphasis 39. However, the second cursor may be represented in alternative manners and shapes.

Figure 4:
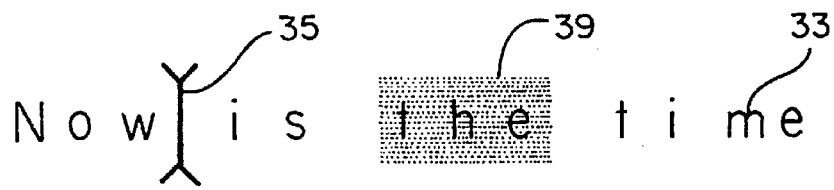
FIG. 4 is a schematic view of the text of FIG. 3, after the cursor has been moved off of the selected text.
Figure 5:
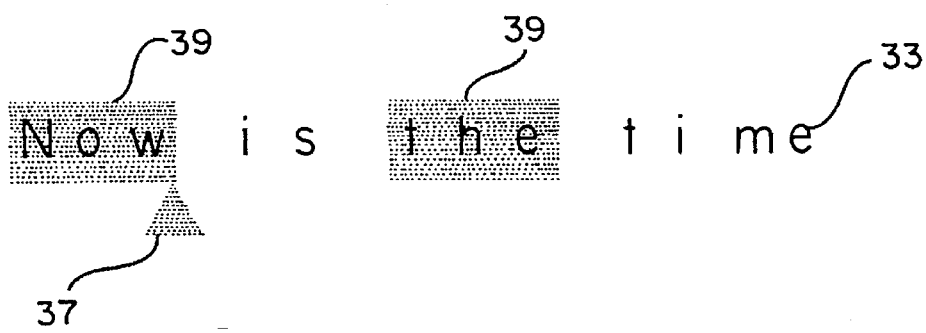
FIG. 5 is a schematic view of the text of FIG. 4, after a second portion of text has been selected.

Multiple portions of text can be selected by moving the swipe and type cursor 37 off of the selected text. When the swipe and type cursor 37 is moved, it reverts back to the normal typing cursor 35 shape as shown in FIG. 4. If the word "Now" is selected, it is highlighted 39 and the cursor is changed to the swipe and type cursor 37, as shown in FIG. 5. Thus, "Now" and "the" have been selected. Operations, such as change the selected text to bold, can be performed both on "Now" and "the".

The second cursor 37 intersects the particular selected emphasis to show which selection is amenable to the swipe and type operation. Thus, in FIG. 5., "Now" is indicated by the cursor 37. Subsequent typing will utilize the swipe and type operation on "Now", while "the" remains unchanged.

The method of the present invention will now be described with reference to the flow charts of FIGS. 6–9. In the flow charts, the following graphical conventions are observed: a diamond for a test or decision, a rectangle for a process or function and a circle for a connector in exiting to or entering from another part of the flow chart. These conventions are well understood by a programmer skilled in the art, and the flow charts are sufficient to enable a programmer skilled in the art to write code in any suitable computer program and language, such as BASIC, PASCAL, or C for a computer such as the IBM Personal System/2 (PS/2) family of computers which supports these languages.

Figure 6:
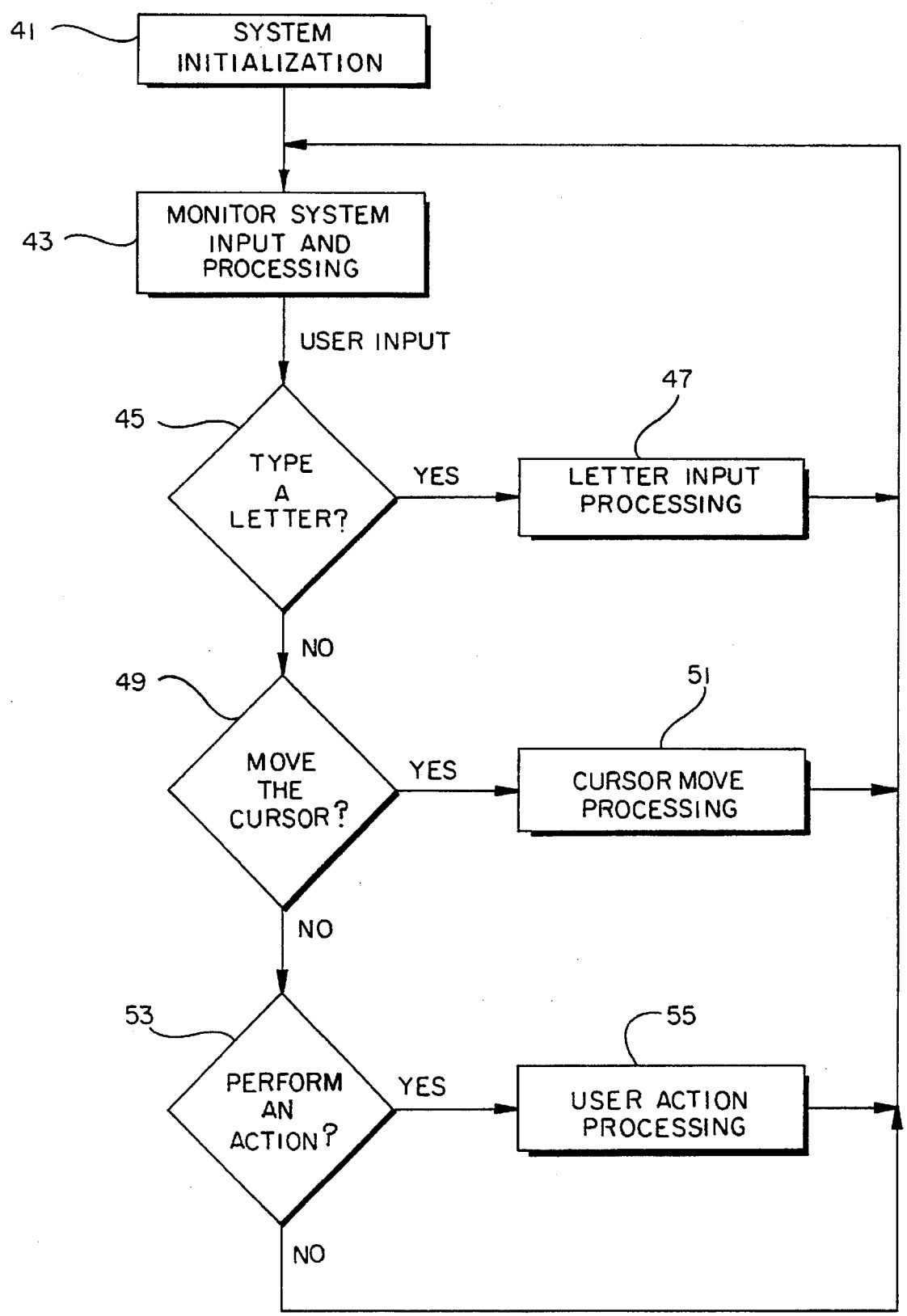
FIGS. 6–9 are flow charts of the method of the present invention.

Referring to FIG. 6, the computer is, in step 41, started and initialized. Then, the system inputs and processing are monitored, step 43. When an input from the operator is received by the system, the method determines if the input is to type a letter, step 45. If the result of step 45 is YES, type a letter, then the next step is to proceed with a letter input processing subroutine 47, shown in FIG. 7. The operator or user provides a type a letter input by keying in text from the keyboard. The subroutine 47 allows the operator to input text characters by a swipe and type operation, by a replace operation, or by an insert operation. If the swipe and type operation is being utilized, then the cursor is changed to the swipe and type cursor. After the letter input processing subroutine 47 has been completed, the method returns to step 43 to monitor system inputs.

Figure 8:
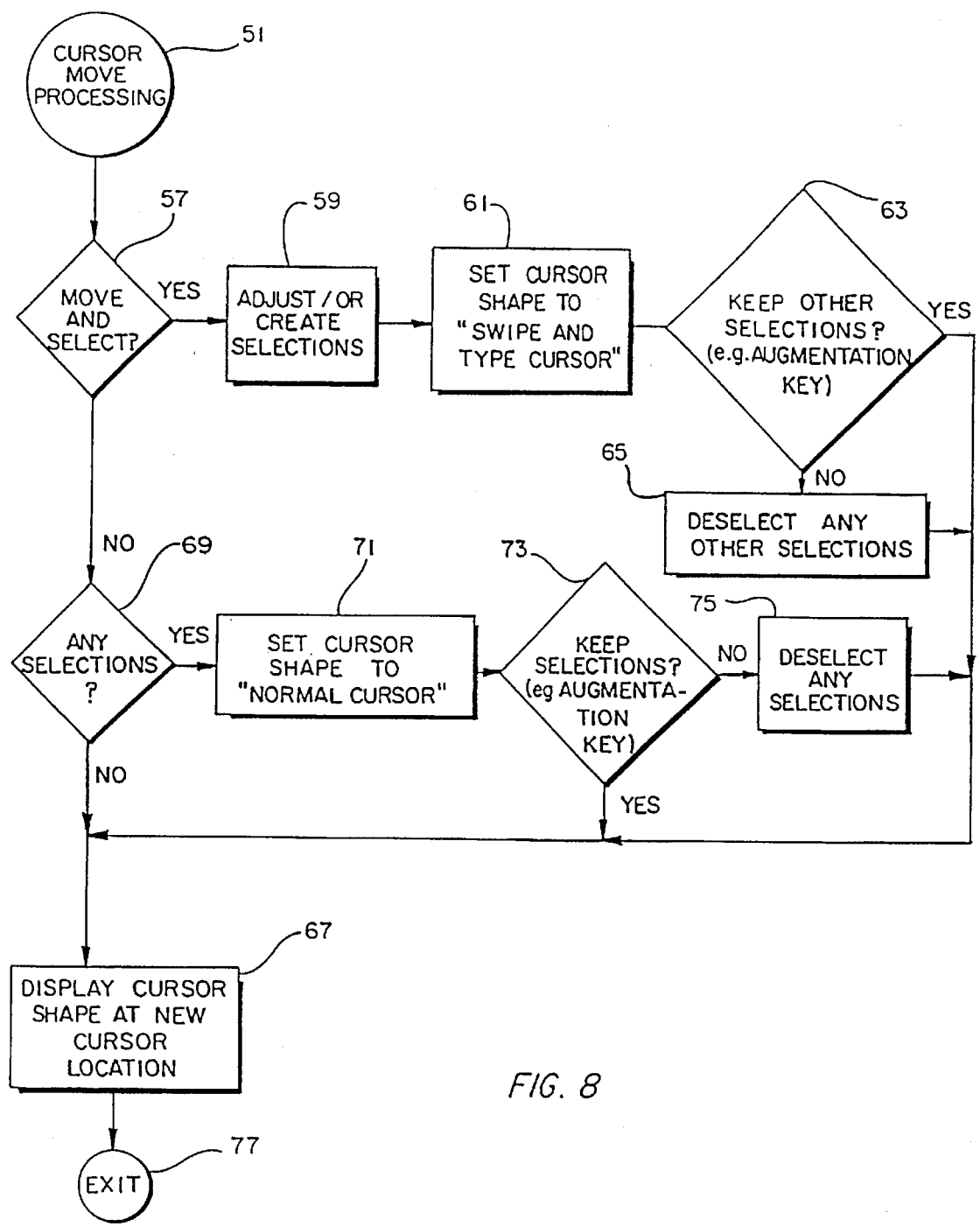

If the result of step 45 is NO, the next determination is made, step 49, wherein it is determined if the input is to move the cursor. If the result of step 49 is YES, then the next step is to proceed with the cursor move processing subroutine 51, as shown in FIG. 8. The operator moves the cursor either by manipulating the mouse 23 or by keying the arrow keys on the keyboard 21. The subroutine 51 determines if a portion of the text is being selected by the cursor, and if so sets the cursor into the swipe and type shape 37. After the cursor move processing subroutine 51 has been completed, the method returns to step 43 to monitor system inputs.

If the result of step 49 is NO, the next determination is made, step 53, wherein it is determined if an action is to be performed. The operator inputs an action command from either the mouse or the keyboard. Examples of actions include print a document, change the font of text to bold, and paste text portions into new locations in a document. If the results of step 53 is YES, the next step is to proceed with a user action processing subroutine 55, shown in FIG. 9. This subroutine 55 determines if the requested action affects any of the selected portions of text, if it affects typing and if it removes the selected emphasis. After the user action processing subroutine 55 has been completed, the method returns to step 43 to monitor system inputs. If the result of step 53 is NO, then the method returns directly to step 43.

Referring to FIG. 8, the cursor move processing subroutine 51 will now be described. The subroutine 51 determines the shape of the cursor. The cursor is set to either the typing cursor 35 or to the swipe and type cursor 37.

The first step 57 is to determine if the cursor movement (that is the typing cursor 35) is selecting a portion of text. If the result of step 57 is YES, then the selected text is highlighted with selected emphasis on the display, step 59. For example, in FIGS. 1 and 2, the word "the" is selected by moving the cursor 35 over "the" while selecting the word. Step 57 detects this, while step 59 highlights 39 "the" as shown in FIG. 2. Step 59 also allows a previously existing selection to be adjusted. For example, the selection could be lengthened to select more text. In step 61, the cursor shape is set to the swipe and type cursor 37 as shown in FIG. 2. Next, in step 63, the method determines if other selections are to be kept. If the result of step 63 is NO, then the other selections are deselected, step 65, by removing the selected emphasis 39 from those other selections. After deselecting the other selections, step 65, or if the result of step 63 is YES, the method proceeds to step 67, wherein the cursor shape is displayed at the new cursor location.

If the result of step 57 is NO, then the method proceeds to step 69, which determines if there are any selections. If the result of step 69 is YES, then the method proceeds to step 71, wherein the cursor shape is set to the normal cursor. Then, in the next step 73, the determination of whether to keep the selections is made. If the result of step 73 is NO, then the selections are deselected, step 75. After deselecting the selections, step 75, or if the result of step 73 is YES, the method proceeds to step 67. If the result of step 69 is NO, the method proceeds to step 67. After step 67, the subroutine is exited, step 77.

Figure 7:
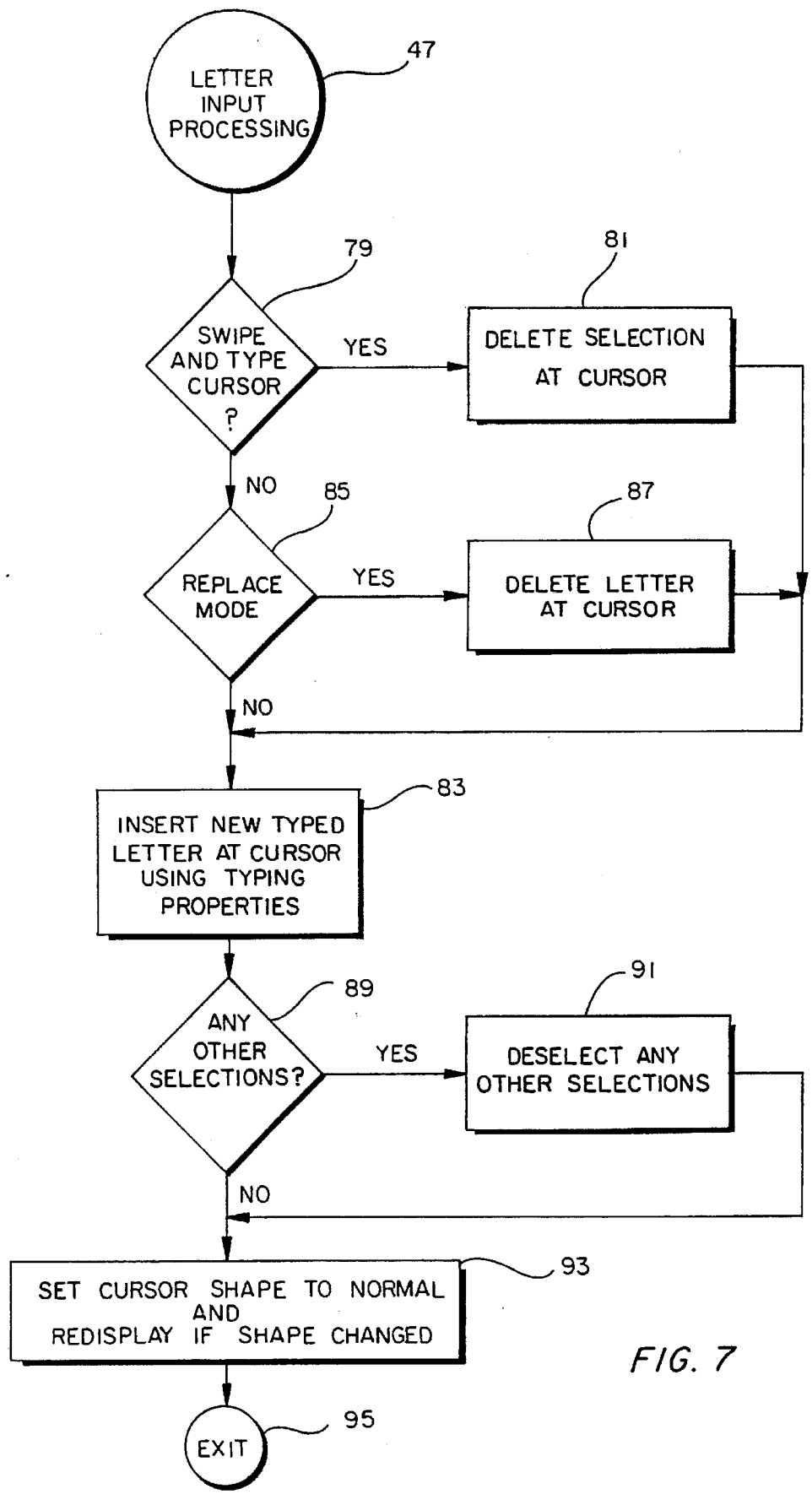

Referring to FIG. 7, the letter input processing subroutine 47 will now be described. The subroutine 47 allows the operator to input text in one of three modes: swipe and type, replace (or overtype) and insert. If the swipe and type mode is being utilized, the swipe and type cursor 37 is present.

The first step 79 determines if the swipe and type mode has been commenced. If the result of step 79 is YES, then the selection at the cursor (the swipe and type cursor) is deleted, step 81. After step 81, the method proceeds to step 83, wherein the new typed letter is inserted at the cursor. If the result of step 79 is NO, then the method proceeds to step 85 wherein it determines if the replace mode has been selected. If YES, the replace mode has been selected, then the letter at the cursor is deleted, step 87. The method then proceeds to step 83 to insert the new typed letter at the cursor. If the result of step 85 is NO, then the method proceeds directly to step 83. After the new letter has been inserted at the cursor, step 83, the method determines if there are any other selections, step 89. If YES, there are other selections, then those other selections are deselected, step 91. After step 91, or if the result of step 89 is NO, the method proceeds to step 93, wherein the cursor shape is set to normal and redisplayed if the shape has been changed. Then the method exits, step 95, the subroutine.

Figure 9:
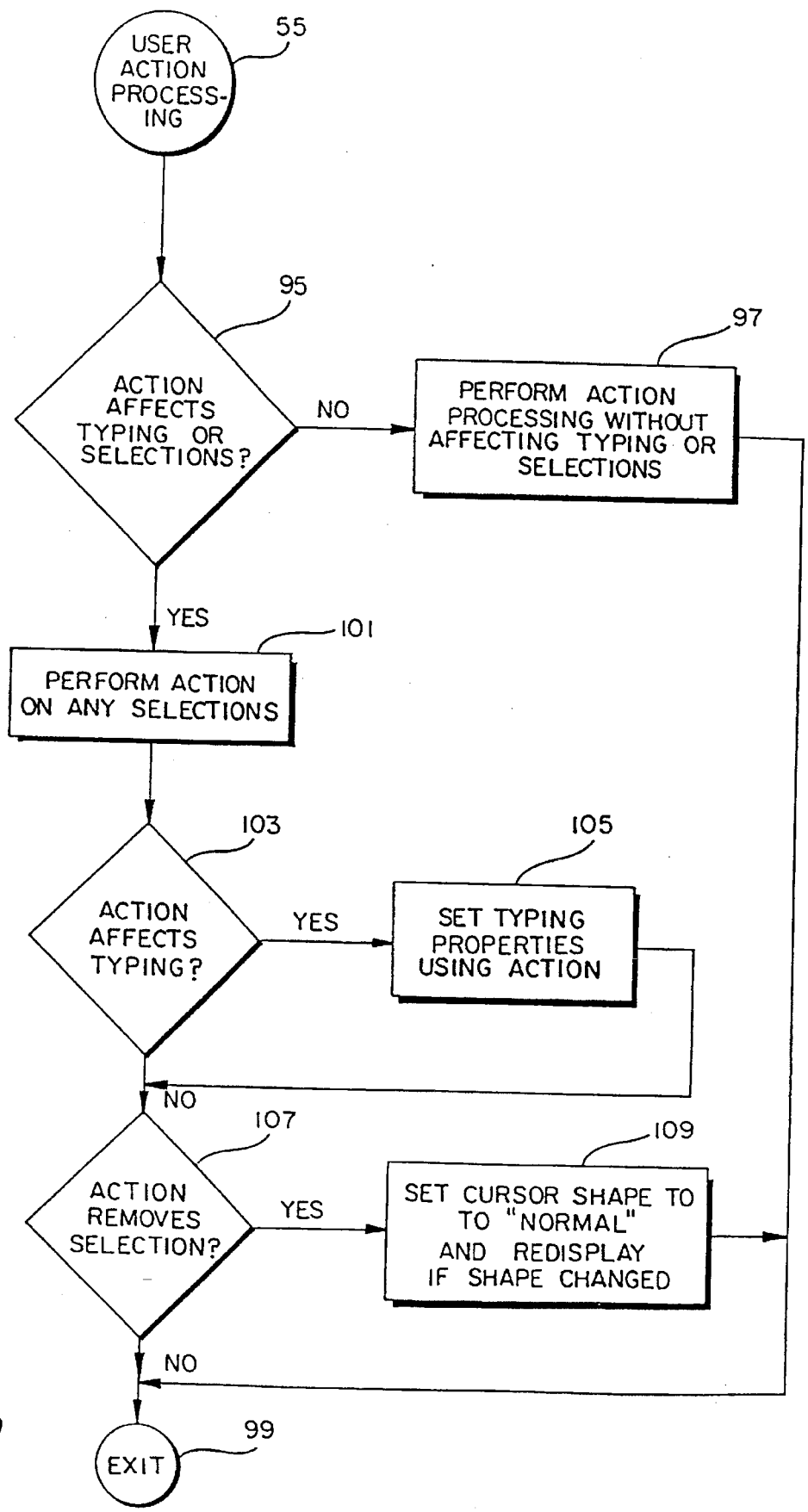

Referring now to FIG. 9, the user action processing subroutine 55 will now be described. The first step 95 determines if the selected action affects typing or selections. If NO, the method proceeds to step 97, wherein the action processing is performed without affecting typing or selections. Then, the method exits, step 99, the subroutine. If the result of step 95 is YES, then the method performs the action on the selections, step 101. Next, the method determines if the action affects typing, step 103. If YES, then in step 105, the method sets the typing properties using the action. After step 105, or if the result of step 103 is NO, the method determines if the action removes the selection, step 107. If YES, the cursor is set to the normal shape and redisplayed if the shape has changed, step 109. Then, the subroutine is exited, step 99. If the result of step 107 is NO, the subroutine is exited directly.

Now various examples of the method of the present invention will be given. The first example utilizes the insert operation to insert a word into a string of text. Referring to FIG. 2, the word "about" will be inserted between "is" and "the", at the location of the typing cursor 35. The operator types in the first letter "a". This is detected by the system in step 43 (see FIG. 6). Step 45 routes the process to the letter input processing subroutine 47. Referring to FIG. 7, the method determines which mode is being utilized. Steps 79 and 85 determine that the swipe and type mode and the replace mode are not being utilized. Thus, the letter "a" is inserted at the cursor, step 83. The method is repeated with the remaining letters of the word.

To utilize the replace mode, the cursor 35 is located at the beginning of the word that is to be deleted. For example, if "the" is to be replaced with "one" the cursor is located on the "t" in "the". The replace mode may be indicated by a cursor in the form of a horizontal line located beneath the letter that is to be replaced. When the letter "o" is typed, step 85 determines that the replace mode is being utilized and therefore "t" is deleted in step 87. The "o" is inserted where the "t" was, step 83. The cursor is then located at the "h" and the process is repeated.

The second example utilizes the swipe and type operation to substitute "a" for "the" in the text. Referring to FIGS. 3, 6 and 8, the word "the" is selected with the cursor move processing subroutine 51. The operator moves the cursor 35 and selects the word "the". Step 49 recognizes this input and routes the method to the cursor move processing subroutine 51. In the cursor move processing subroutine 51 (see FIG. 8), step 57 recognizes the move and select, wherein in step 59, the selection is created. Thus, the highlighting 39 is displayed over "the". Next, in step 61, the cursor is set to the swipe and type cursor 37 and displayed in step 67. Steps 63 and 65 allow any other selections to be deselected and maintained as selections. Use of an augmentation key provides the necessary input for step 63. For this example, any other selections are deselected in step 65.

After the word "the" has been selected, the swipe and type cursor indicates that subsequent typing will utilize the swipe and type operation. Thus, if the operator were to type "a", the letter input processing subroutine 47 would be utilized. In step 79, the use of the swipe and type cursor would be determined, wherein in step 81, "the" would be deleted. Then, in step 83, "a" would be inserted. The cursor would be set to the normal typing cursor 35 and would appear to the right of "a". Steps 89 and 91 deselect any other selections. Step 93 sets the cursor shape to normal and redisplays the cursor with the new shape.

The swipe and type operation need not be utilized for "the". "the" is selected and as such can be edited according to other actions or operations. For example, the font of "the" can be changed to bold.

The third example utilizes the selection of multiple portions of text to select "Now" and "the", as shown in FIG. 5. "The" has been selected as described above. To select "Now", the cursor is moved off of "the" and to "Now". As the cursor is moved, it reverts back to the normal cursor 35 shown in FIG. 4. For this operation, the cursor move processing subroutine 51 is utilized. Step 57 determines that such cursor movement is not a move and select. Step 69 determines that there are selections, namely "the". Step 71 sets the cursor to normal and step 67 redisplays the cursor. Steps 73 and 75 allow the deselection or maintaining of the selections. In this example, the selection of "the" is maintained by use of an augmentation key, and step 75 is not utilized.

After the cursor has been positioned on "Now", "Now" is then selected by the cursor. Steps 57, 59 and 61 create the selection and set the cursor to the swipe and type cursor 37. The result is the text shown in FIG. 5.

The swipe and type cursor indicates that the newly selected portion of text can utilize the swipe and type operation. The swipe and type operation is activated by typing in a text character, as described in the second example. In addition to displaying the swipe and type cursor, multiple portions of text have been selected. These multiple selections, which may be adjacent or non-adjacent to each other, allow the operator to perform actions on all of those selected portions of text as illustrated in the fourth example below.

In the fourth example, actions on multiple selections of text are taken. Referring to FIG. 5, where "Now" and "the" are selected, and to FIGS. 6 and 9, an action input is routed to the user action processing subroutine 55. The first step 95 in the subroutine 55 determines if the action affects typing or selections. If the action is to print the document, the result of step 95 is NO. Step 97 is then performed, wherein the action is performed without affecting typing or selections. Thus, the document is printed and the display remains as shown in FIG. 5.

If, for example, the action changes the font to bold, then the action does affect typing. In step 101, the action is performed on the selections, wherein "Now" and "the" are both changed to bold. If the action affects typing, step 103, the typing properties are set using the action, step 105. If the action removes the selection, step 107, then the cursor is set to the normal shape 35, step 109. For example, paste is an action that removes the selection.

Selected portions of text can be deselected after typing in a text character, steps 89 and 91 or after moving the cursor, steps 63, 65 or steps 73, 75. When moving the cursor, the operator has the option of either maintaining the selections already made (by using an augmentation key) or deselecting those selections.

The foregoing disclosure and the showings made in the drawings are merely illustrative of the principles of this invention and are not to be interpreted in a limiting sense.

We claim:

1. A method for providing multiple selections in text in a data processing system, comprising the steps of:

a) displaying text and a first cursor on an interface means for interfacing with an operator, said first cursor indicating where a text input into said data processing system is to be inserted on said interface means;

b) detecting a selection input from said operator, said selection input selecting a portion of text on said interface means;

c) displaying said selected portion of text with emphasis on said interface means;

d) changing said first cursor to a second cursor and displaying said second cursor on said interface means at said selected emphasized portion of text, said second cursor being displayed in addition to said emphasized portion of text.

2. The method of claim 1 further comprising the steps of:

a) after said second cursor is displayed, detecting said text input;

b) in response to detecting said text input, deleting said selected portion of said text at said second cursor, deleting said second cursor and inserting said detected text input at said deleted text location.

3. The method of claim 2 further comprising the step of, after deleting said selected portion of text and said second cursor, redisplaying said first cursor at said deleted text location.

4. A method for providing multiple selections in text in a data processing system, comprising the steps of:
   a) displaying text and a first cursor on an interface means for interfacing with an operator, said first cursor indicating where a text input into said data processing system is to be inserted on said interface means;
   b) detecting a selection input from said operator, said selection input selecting a portion of text on said interface means;
   c) displaying said selected portion of text with emphasis on said interface means;
   d) changing said first cursor to a second cursor and displaying said second cursor on said interface means at said selected emphasized portion of text;
   e) detecting an input for locating an insertion of new text in a new location in said text, said new location being outside of said selected portion of text;
   f) continuing to display said selected portion of text with said emphasis on said interface means;
   g) in response to detecting said input for locating an insertion of new text, changing said second cursor to said first cursor.

5. A method for providing multiple selections in text in a data processing system, comprising the steps of:
   a) displaying text and a first cursor on an interface means for interfacing with an operator, said first cursor indicating an insertion point where a text input into said data processing system is to be inserted;
   b) detecting a first input from said operator, said first input selecting a first portion of text on said interface means;
   c) displaying on said interface means said first portion of text with emphasis, so as to provide a first emphasized portion of text;
   d) detecting a second input from said operator, said second input moving said insertion point to a new location in said text, said new location being outside of said first selected portion of text, and displaying on said interface means said first cursor in said new text location while preserving said first selected portion of text;
   e) detecting a third input from said operator, said third input selecting a second portion of text on said interface means;
   f) displaying on said interface means said second portion of text with emphasis so as to provide a second emphasized portion of text;
   g) changing said first cursor to a second cursor and displaying said second cursor on said interface means at one of said respective first or second emphasized portions of text whenever said respective first or second emphasized portion of text is emphasized;
   h) while said second cursor is displayed, detecting a fourth input from said operator, said fourth input comprising a text character, wherein when said fourth input is detected, said second cursor and said respective selected portion of text with which said second cursor is displayed at are deleted and said text character is inserted at the location of said deleted text.

6. The method of claim 5 further comprising the step of changing said second cursor to said first cursor when said respective selected portion of text is deleted due to the detection of said fourth input, and redisplaying said first cursor on said interface means at the location of said deleted text.

7. The method of claim 6 further comprising the step of changing said second cursor to said first cursor whenever said insertion point is moved in response to said second input.

8. The method of claim 7 further comprising the step of detecting a fifth input, said fifth input deselecting one or more of said respective selected portions of text, and displaying on said interface means said deselected respective selected portions of text without selected emphasis.

9. The method of claim 5 further comprising the step of detecting a fifth input, said fifth input deselecting one or more of said respective selected portions of text, and displaying on said interface means said deselected respective selected portions of text without selected emphasis.

10. The method of claim 5 further comprising the step of changing said second cursor to said first cursor whenever said insertion point is moved in response to said second input.

11. The method of claim 5 further comprising the step of deselecting said selected first portion of text when said fourth input is detected and displaying said first portion of text on said interface means without selected emphasis.

12. A data processing system, comprising:
   a) interface means for displaying information from said system to an operator;
   b) means for displaying said information on said interface means, said means for displaying said information being connected to said interface means, said information being displayed comprising text and a first cursor for indicating where a next text character that is input into said data processing system is to be inserted;
   c) means for detecting an operator input for selecting a portion of text on said interface means, said means for detecting an operator input providing said selected portion of text with emphasis, said means for detecting an operator input changing said first cursor to a second cursor that is displayed in association with said emphasized text when said operator input is detected, said means for detecting an operator input being connected to said means for displaying said information;
   d) means for detecting a text character input when said second cursor is displayed, said means for detecting a text character input deleting said emphasized portion of text and inserting said detected text character at the location of said deleted text, said means for detecting a text character input being connected to said means for displaying said information.

13. A data processing system, comprising:
   a) interface means for displaying information from said system to an operator;
   b) means for displaying said information on said interface means, said means for displaying said information being connected to said interface means, said information being displayed comprising text and a first cursor for indicating an insertion point where a next text character that is input into said data processing system is to be inserted;
   c) means for detecting an operator input, said input comprising a first input for selecting a first portion of text on said interface means, a second input for moving said insertion point and a third input for selecting a second portion of text, said means for detecting an operator input providing said respective selected portions of text with emphasis when said respective input is detected, said means for detecting an operator input changing said first cursor to a second cursor when one of said first or third inputs is detected, said second cursor being located at said respective selected portion of text, said means for detecting an operator input moving said first cursor to a new location when said second input is detected, said new location being outside of said first portion of text, said means for detecting an operator input being connected to said means for displaying said information on said interface means;

d) means for detecting a text character input when said second cursor is displayed, said means for detecting a text character input deleting said respective selected portion of text that is at said second cursor and inserting said detected text character at the location of said deleted text, said means for detecting a text character input being connected to said means for displaying said information.

* * * * *